United States Patent
Huttunen

(10) Patent No.: US 7,016,434 B1
(45) Date of Patent: Mar. 21, 2006

(54) DETECTION OF INTERFERING SIGNAL IN RADIO RECEIVER

(75) Inventor: Mikko Huttunen, Espoo (FI)

(73) Assignee: Nokia Networks Oy, Espoo (FI)

(*) Notice: Subject to any disclaimer, the term of this patent is extended or adjusted under 35 U.S.C. 154(b) by 0 days.

(21) Appl. No.: 09/700,951

(22) PCT Filed: May 24, 1999

(86) PCT No.: PCT/FI99/00443

§ 371 (c)(1),
(2), (4) Date: Nov. 21, 2000

(87) PCT Pub. No.: WO99/62190

PCT Pub. Date: Dec. 2, 1999

(30) Foreign Application Priority Data

May 25, 1998 (FI) .................................. 981152

(51) Int. Cl.
*H04L 1/00* (2006.01)
(52) U.S. Cl. ........................ 375/341; 375/346
(58) Field of Classification Search ................ 375/341,
375/316, 340, 346, 130, 219, 136, 140, 147,
375/148, 348
See application file for complete search history.

(56) References Cited

U.S. PATENT DOCUMENTS

| | | | |
|---|---|---|---|
| 5,323,421 A | 6/1994 | LaRosa et al. | |
| 5,363,412 A | 11/1994 | Love et al. | |
| 5,440,582 A * | 8/1995 | Birchler et al. | 375/227 |
| 5,541,955 A | 7/1996 | Jacobsmeyer | |
| 5,809,009 A | 9/1998 | Matsuoka et al. | |
| 5,881,097 A | 3/1999 | Lilleberg et al. | |
| 5,905,946 A | 5/1999 | Lilleberg et al. | |
| 5,936,979 A | 8/1999 | Jyrkkä | |
| 5,995,499 A | 11/1999 | Hottinen et al. | |
| 6,115,435 A * | 9/2000 | Harada et al. | 375/341 |
| 6,137,824 A | 10/2000 | Liu | |
| 6,192,038 B1 * | 2/2001 | Wallerius et al. | 370/328 |
| 6,337,855 B1 | 1/2002 | Malkamäki | |
| 6,353,913 B1 | 3/2002 | Huttunen | |
| 6,463,294 B1 | 10/2002 | Holma et al. | |
| 6,567,475 B1 * | 5/2003 | Dent et al. | 375/286 |
| 6,721,374 B1 | 4/2004 | Piirainen | |
| 6,792,053 B1 | 9/2004 | Vainio et al. | |

FOREIGN PATENT DOCUMENTS

| | | |
|---|---|---|
| EP | 0 671 836 | 9/1995 |
| GB | 2 250 667 | 6/1992 |
| JP | 9-83590 | 3/1997 |
| WO | 96/11533 | 4/1996 |
| WO | WO 96/11533 | 4/1996 |
| WO | 98/01959 | 1/1998 |
| WO | WO 98/01959 | 1/1998 |

* cited by examiner

Primary Examiner—Cheih M. Fan
Assistant Examiner—Jason M. Perilla
(74) Attorney, Agent, or Firm—Pillsbury Winthrop Shaw Pittman LLP

(57) ABSTRACT

A method and equipment for detecting an interfering signal in a time division multiple access radio receiver, in which case, samples are taken from a received signal in symbol sequences over a time division multiple access timeslot, a signal path corresponding to the time division multiple access timeslot, or a portion thereof, is generated by a modulation detector, an error estimate representing the erroneousness of the signal path generated is determined, the error estimate is compared with a predetermined threshold value, and the reception of the interfering signal is recognized if the error estimate is greater than the predetermined threshold value.

8 Claims, 4 Drawing Sheets

DETECTION OF INTERFERING SIGNAL IN RADIO RECEIVER

This application is a national phase of international application PCT/FI99/00443 filed May 24, 1999 which designated the U.S.

BACKGROUND OF THE INVENTION

The invention relates to a method of detecting an interfering signal in a time division multiple access (TDMA) radio receiver.

When information is transferred over a radio channel, a signal to be transmitted has to be modulated. In modulation, the aim is to obtain a signal of a form which can be transmitted at a radio frequency. The prerequisite of a good modulation method is, for example, that it enables maximum amount of information to be transferred in a narrowest possible frequency band. Depending on the purpose of use, other features may also be stressed. Furthermore, modulation must not generate more than a minimum amount of interference to a neighbouring channel.

One of the modulation methods is called $\pi/4$-DQPSK ($\pi/4$-shifted, Differential Quaternary Phase Shift Keying) modulation. This modulation method comprises eight phase states, but only four phase shifts. The accepted phase shifts (symbols) are $\pm\pi/4$ and $\pm 3\pi/4$. FIG. 3A shows a modulation constellation diagram. Each phase shift corresponds to two bits that are to be transmitted. In other words, a digital signal modulates a carrier in two-bit sequences in such a way that a given phase shift corresponds to each two-bit combination during each symbol sequence. A symbol sequence refers here to a signal sequence which is used for transmitting the two bits. The phase shifts, which correspond to bit combinations 00, 01, 10 and 11, are $\pi/4$, $3\pi/4$, $-\pi/4$ and $-3\pi/4$. The symbol frequency used by the Terrestrial Trunked Radio system (TETRA), for example, is 18 kHz and, consequently, the bit frequency is 36 kHz.

When a signal is received it has to be demodulated, i.e. the bits which are modulated to the signal have to be detected by a detector so as to find out the information included therein. In transmission over a radio path, an interfering signal may sometimes appear at the frequency used, which interfering signal uses a different modulation method from the one used by the actual signal. In the TETRA system, for example, such an interfering signal can be detected by examining the training sequence, which is always included in a timeslot, of the received timeslot. When the bit error ratio of the training sequence is calculated by comparing the training sequence with the stored version of the training sequence and the bit error ratio exceeds a given threshold value, then the received signal is found out to be an interfering signal.

A problem in the above arrangement is that factors, such as strong signal fading, which degrade the quality of reception may occur during the training sequence of the actual signal. The number of bit errors may then become so large that an interfering signal is mistakenly thought to exist.

BRIEF DESCRIPTION OF THE INVENTION

An object of the invention is thus to provide a method so as to solve the above problems. The objectives of the invention are achieved by a method which is characterized by in the method taking samples from symbol sequences of a received signal over a TDMA timeslot, generating by a modulation detector a signal path corresponding to the TDMA timeslot or a portion thereof, determining an error estimate representing the erroneousness of the signal path generated, comparing the error estimate with a predetermined threshold value, and recognizing the reception of the interfering signal if the error estimate is greater than the predetermined threshold value.

The invention is based on the idea of determining an error estimate which represents the erroneousness of a signal path which corresponds to a TDMA timeslot, or a portion of the TDMA timeslot, of the received signal. The error estimate is compared with a predetermined threshold value, and on the basis thereof it is detected whether the received signal is an interfering signal.

It is an advantage of the method of the invention that when a half timeslot, for example, is used as a detection interval, an interfering signal can be detected more reliably than it would be done only on the basis of the training sequence. Furthermore, an error estimate possibly generated in connection with the normal signal detection can be used as an error estimate, enabling an extremely simple implementation.

The invention also relates to equipment for detecting an interfering signal in a time division multiple access (TDMA) radio receiver, whereby the equipment is characterized in that the equipment comprises means for taking samples from symbol sequences of a received signal over a TDMA timeslot and a modulation detector for generating a signal path corresponding to the TDMA timeslot or a portion thereof, and that the equipment is arranged to determine an error estimate representing the erroneousness of the signal path generated and to compare the error estimate with a predetermined threshold value, and that the equipment is also arranged to recognize the reception of the interfering signal if the error estimate is greater than the predetermined threshold value. Such equipment enables the advantages of the method of the invention to be achieved in a simple manner.

BRIEF DESCRIPTION OF THE DRAWINGS

In the following, the invention will be described in more detail by means of preferred embodiments with reference to the accompanying drawings, in which.

DETAILED DESCRIPTION OF THE INVENTION

In the following, the invention is described in connection with the TETRA system with no intention to restrict the invention to any specific system or a modulation method.

Figure 2:
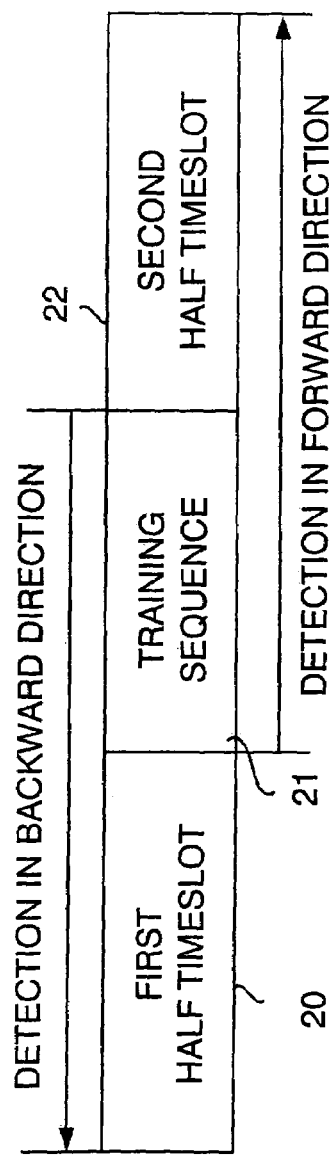
FIG. 2 shows a simplified diagram of a frame structure of the TETRA system.

In the TETRA system, information bits which are obtained from a medium access layer (MAC) of a transmission path are encoded by block coding and convolution coding so as to detect and possibly correct at reception the errors arising in a signal on a radio path. The encoded bits are interleaved in such a way that successive bits are far apart from one another. This facilitates error correction in case an instantaneous error falls on the radio path on the signal to be transmitted. The interleaved bits are mixed by using a given colour code by which the transmissions of different base stations can be recognized. In multiplexing, bits of different logical channels are combined. Thereafter, a burst is generated from the multiplexed bits. A burst is a structure which is transmitted in one time division multiple access (TDMA) timeslot or sub-timeslot. The burst is composed of data bit fields 20 and 22 and a training sequence 21 therebetween in the middle of the burst, as illustrated in FIG. 2. Differential coding generates modulating symbols from pairs of bits of a burst. A carrier which is modulated by control of symbols is amplified in a transmitter and transmitted onto the radio path.

The modulation is the above-described π/4-DQPSK (π/4-shifted, Differential Quaternary Phase Shift Keying) modulation. This modulation method comprises eight phase states, but only four phase shifts. The accepted phase shifts (symbols) are ±π/4 and ±3π/4. In practice, the π/4-DQPSK constellation thus varies at symbol intervals between two 4-pointed constellations which are illustrated in FIG. 3B with four black points (the first constellation) and with four white points (the second constellation). When the symbol sequence changes it is only possible to shift from the white point to the black point and from the black point to the white point. Each of these eight constellation points can be presented with numbers 0 to 3, as shown in FIG. 3B. The constellation points may shift because of the non-idealities of the radio channel.

Figure 1:
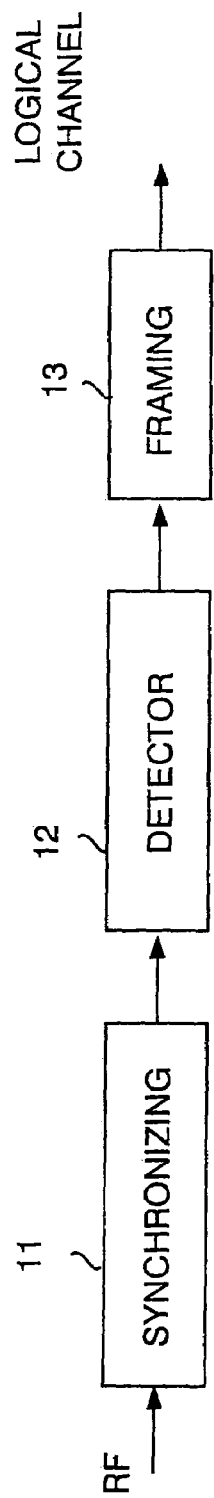
FIG. 1 shows a block diagram of a structure of reception of the TETRA system.

FIG. 1 shows a block diagram of a receiver structure of the invention for the TETRA system, for example. Only parts of the transceiver which are essential to the description of the invention are shown. In reception, a signal is obtained from an antenna (not shown), and the signal is first processed by radio-frequency parts. Next, A/D converters (not shown) take samples from an intermediate frequency signal. The samples are supplied to a synchronizing block 11, as illustrated by a signal RF in FIG. 1. The synchronizing block 11 searches the obtained samples for a training sequence 21 which belongs to the frame structure. The training sequence enables the synchronizing block to accurately determine the moment of sampling, i.e. positions of all the symbols in a sample stream. The synchronizing block also controls the radio-frequency parts of the receiver in order that the signal which is supplied to the A/D converter would stay at an optimal level. The synchronizing block gives a frame to a channel equalizer and a detector block 12. The channel equalizer corrects the non-idealities caused by the radio path channel, and the detector associated with the channel equalizer detects the information bits. Finally, a logical channel is generated from the frame in framing 13, and the logical channel is forwarded for further processing.

In order to facilitate the understanding of the invention, an example is described above of a general structure of the transceiver. However, the structure of the transceiver may vary without deviating from the present invention.

Figure 4:
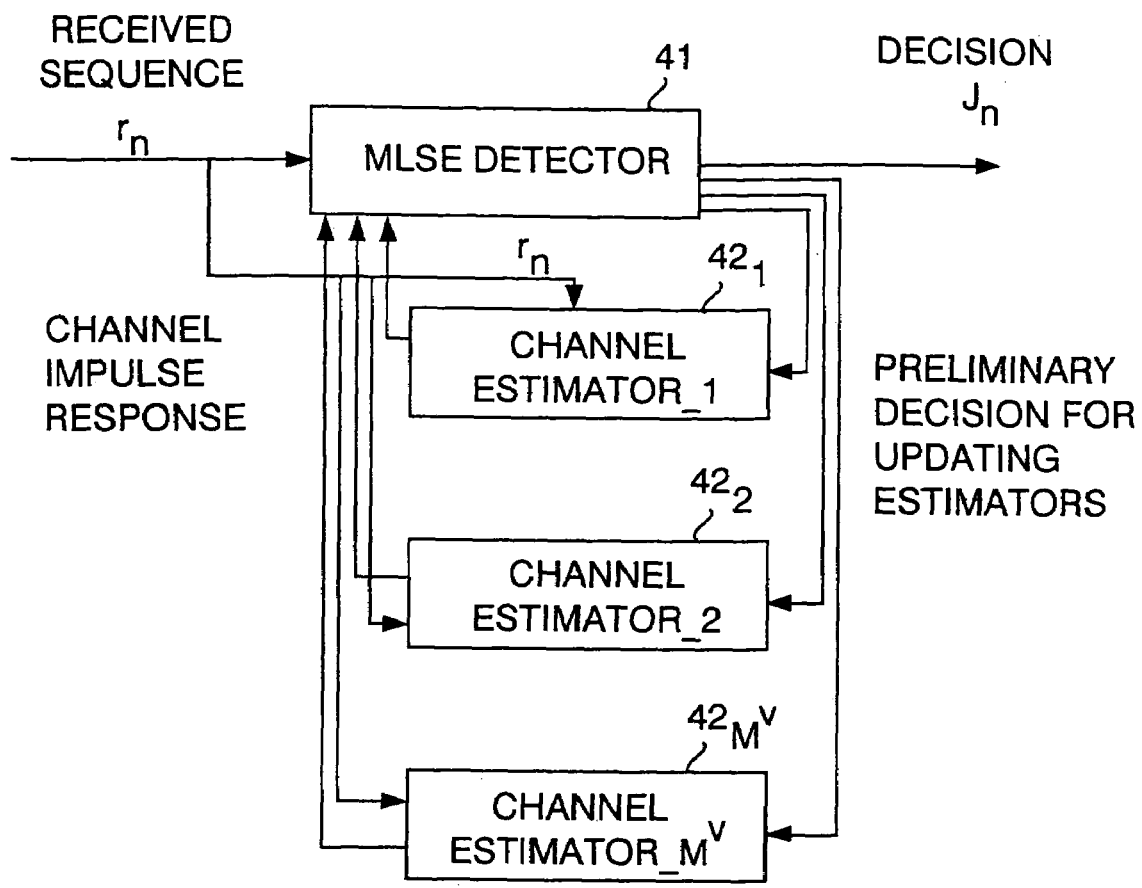
FIG. 4 shows a block diagram of an adaptive MLSE detector and channel estimators associated therewith according to an embodiment.

In a preferred embodiment of the invention, the detector 12 is a MLSE detector which is provided with a Viterbi algorithm. In other words, the adaptive MLSE detector comprises a Viterbi detector 41 and at least one adaptive channel estimator $42_a$ (a=1 ... $M^V$), as shown in FIG. 4. The Viterbi detector 41 estimates the transmitted sequence from the received sequence $r_n$ by a description created by the channel estimator $42_a$ of an impulse response of the radio channel. The channel estimator $42_a$ adaptively estimates the impulse response of the radio channel by decisions $J_n$ or preliminary decisions which are made by the Viterbi detector 41. One channel estimate corresponds to one sequence of the Viterbi detector. It is possible to implement these estimates by one common channel estimator. However, this leads to degraded tracking ability of the channel estimator. The embodiment presented in FIG. 4 comprises several parallel channel estimators $42_a$, preferably as many as there are sequences.

It is typical of the radio path that the signal which is transmitted arrives to the receiver over several paths which each have a specific time delay. In addition, channel properties change as a function of time. For example, beams that are reflected and delayed on the radio path generate intersymbol interference (ISI). The frequency response or the impulse response of the channel may be estimated by a discrete-time filter, i.e. a channel estimator, whose tap coefficients model the radio channel. The aim is to describe the state of the radio channel by means of the channel estimate.

A channel estimator generally refers in this description to a mechanism which estimates and maintains a description of the complex impulse response of the radio channel. A method by which the channel estimate is updated is substantially associated with this mechanism. In the TETRA system, a least mean square (LMS) algorithm can be used for updating the channel estimates. In order to ensure that the LMS algorithm is converged before the start of the actual information bits, the detector 12 has to obtain the best possible initial estimate of the channel state. This estimate is obtained from the synchronizing block 11 which calculates a complex cross-correlation between the training sequence 21 of the received signal and the stored version of the training sequence. The cross-correlation result provides an initial value for the channel estimate, the initial value indicating the average state of the channel during the training sequence. Channel correction and symbol detection begin not until the training sequence is received. This ensures that the timing of the symbols can be adjusted as accurately as possible and the initial estimate of the channel can be generated by symbol synchronization. The channel correction both in the forward direction and in the backward direction takes place in such a way that after the estimates have been initialized, the detector 12 is instructed over the training sequence 21 towards the end of the burst or towards the start of the burst, respectively, as shown in FIG. 2.

A Viterbi algorithm is a method by which a trellis is searched from a set of signal paths for a signal path which corresponds to the maximum likelihood. In the set of signal paths, one channel estimate preferably corresponds to one signal path. It is also possible to use an estimate common to all paths, as already mentioned above. Signal paths refer here to various combinations of successive modulation symbols. At each search stage for the trellis, $M^L$ sequences advance in the detector, each sequence comprising a specific path metric which is based on the Euclidean distance. Reference constellation points are constructed on the basis of the information which is available on the current state of the channel, i.e. on the basis of the channel estimate. When the reference constellation points have been calculated, the difference between the reference point and the received sample can be calculated for each channel estimate. The channel estimate can be updated by means of this error. The error metric of a given signal path is calculated by summing up the error metrics, i.e. quadratic errors, of all the points of the signal path.

Figure 5:
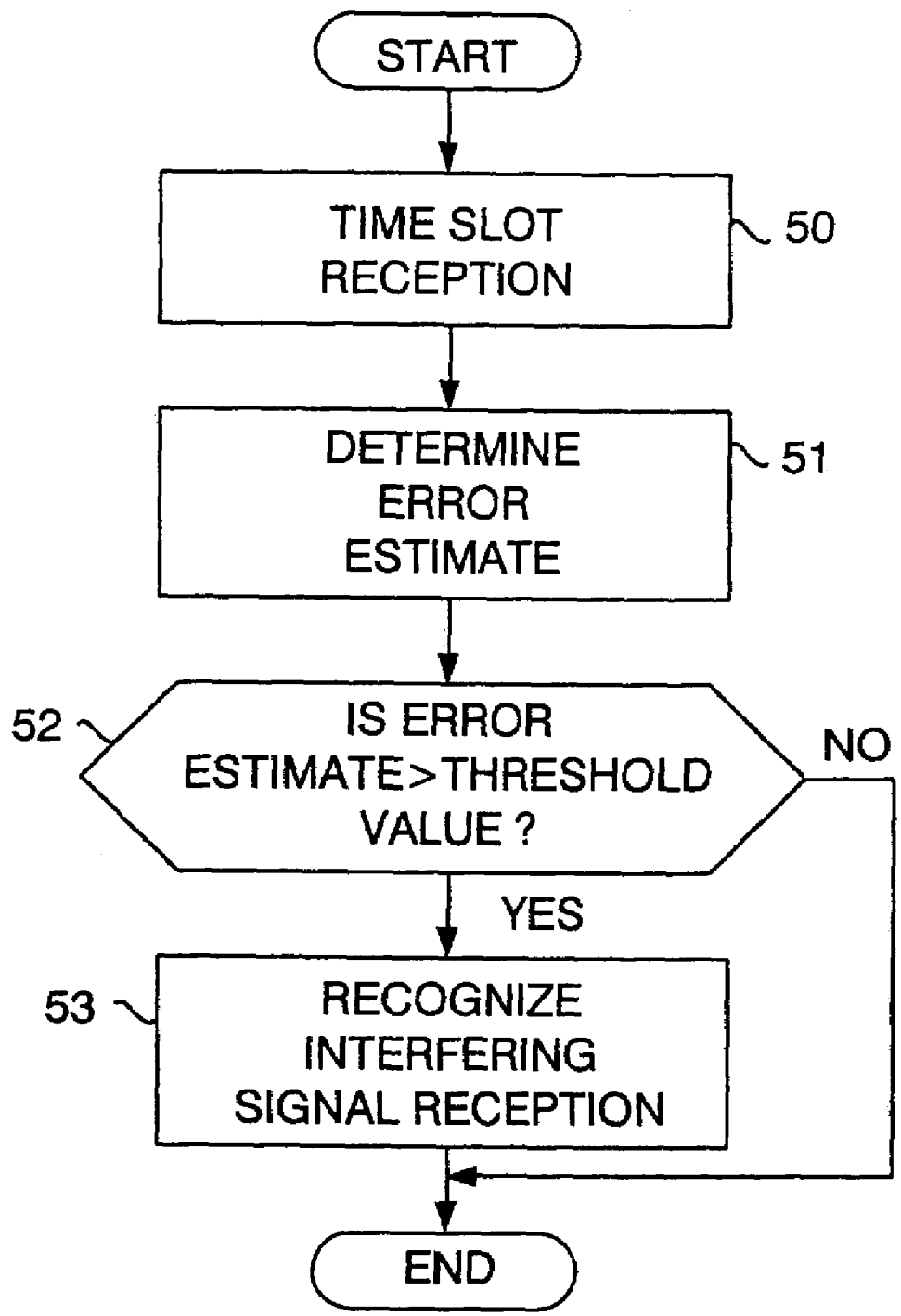
FIG. 5 shows a flow diagram of an embodiment of the method of the invention.

FIG. 5 shows a flow diagram of an embodiment of the method of the invention. In accordance with the basic idea of the invention, in step 51 an error estimate is determined which represents the erroneousness of the signal path which corresponds to the timeslot, or a portion of the timeslot, of a signal received in step 50. According to the preferred embodiment of the invention, the error estimate is determined for a half timeslot 20 or 22. Furthermore, according to the preferred embodiment, as the error estimate is used an error metric which is generated by the detector 12, in addition to the bits it has detected, to represent in the manner described above in the description the erroneousness of the bit information the detector has generated. Next, in step 52 the error metric is compared with a predetermined threshold value. If the error metric value exceeds the threshold value, i.e. if the erroneousness of the signal for each half timeslot is greater than the predetermined value, then it can be assumed that the received signal is an interfering signal or a signal other than a TETRA-modulated signal (step 53). The method can be made more reliable by using a detection time period which is longer than a half timeslot.

According to an alternative embodiment of the invention, besides the detector 12, one or more parallel detectors preferably of different types are employed. The parallel detectors operate independently and each of them generate an error metric value of their own for the information they have produced. The detector having the best error metric value is selected from these parallel detectors, and the routine proceeds in accordance with the first preferred embodiment of the invention by comparing the error metric of the selected detector with the predetermined threshold value as described above. When parallel detectors of different types are used, good performance can be achieved by one detector even in reception conditions in which the other detector does not operate optimally. A coherent detector, for example, operates well on a channel which contains noise but does not contain intersymbol interference. Correspondingly, a better performance is achieved by a channel equalizer-type detector on a channel which contains intersymbol interference.

It will be apparent to those skilled in the art that progress in technology enables the basic idea of the invention to be implemented in various ways. The invention and its embodiments are therefore not restricted to the above examples but they may vary within the scope of the claims.

The invention claimed is:

1. A method of detecting an interfering data-bearing communication signal in a time division multiple access (TDMA) radio receiver, the method comprising:
    taking samples from symbol sequences of a received signal over a TDMA timeslot;
    generating by a modulation detector a signal path corresponding to the TDMA timeslot or a portion thereof;
    determining an error estimate representing the erroneousness of the signal path generated;
    comparing the error estimate representing the erroneousness of the signal path generated with a predetermined threshold value; and
    recognizing the reception of the interfering data-bearing communication signal if the error estimate is greater than the predetermined threshold value,
    wherein the error estimate representing the erroneousness of the signal path generated is a signal path error metric which is generated by means of quadratic errors which are calculated on the basis of a difference between individual symbol sequence specific sample points and corresponding reference constellation points constructed on the basis of a channel estimate describing a state of a radio channel used.

2. The method of claim 1, further comprising using in the comparison an error estimate of a signal path corresponding to a half timeslot.

3. The method of claim 1 or 2, further comprising:
    generating two or more alternative signal paths from the received timeslot or a portion thereof by two or more parallel modulation detectors of different types,
    determining an error estimate of each signal path, and
    selecting the signal path corresponding to the error estimate having the least amount of error to be used in the comparison.

4. Equipment for detecting an interfering data-bearing communication signal in a time division multiple access (TDMA) radio receiver, the equipment comprising:
    means for taking samples from symbol sequences of a received signal over a TDMA timeslot; and
    a modulation detector for generating a signal path corresponding to the TDMA timeslot or a portion thereof, wherein
    the equipment is arranged to determine an error estimate representing the erroneousness of the signal path generated, to compare the error estimate representing the erroneousness of the signal path generated with a predetermined threshold value, and to recognize the reception of the interfering data-bearing communication signal if the error estimate is greater than the predetermined threshold value, and
    the equipment is arranged to use a signal path error metric, which is generated by means of quadratic errors calculated on the basis of a difference between individual symbol sequence specific sample points and corresponding reference constellation points constructed on the basis of a channel estimate describing a state of a radio channel used, as the error estimate representing the erroneousness of the signal path.

5. The equipment of claim 4, further arranged to use in the comparison an error estimate of a signal path corresponding to a half timeslot.

6. The equipment of claim 4 or 5, comprising two or more parallel modulation detectors of different types for generating two or more alternative signal paths from the received timeslot or a portion thereof, the equipment being arranged to determine an error estimate of each signal path and to select the signal path corresponding to the error estimate having the least amount of error to be used in the comparison.

7. A method of detecting an interfering data-bearing communication signal in a time division multiple access (TDMA) radio receiver, the method comprising:
    taking samples from symbol sequences of a received signal over a TDMA timeslot;
    generating by a modulation detector a signal path corresponding to the TDMA timeslot or a portion thereof;
    determining an error estimate representing the erroneousness of the signal path generated;
    comparing the error estimate representing the erroneousness of the signal path generated with a predetermined threshold value; and
    recognizing the reception of the interfering data-bearing communication signal if the error estimate is greater than the predetermined threshold value,
    wherein the error estimate is at least in part generated by individually determining a plurality of point to point quadratic error comparisons between the generated signal path and a reference signal path.

8. Equipment for detecting an interfering data-bearing communication signal in a time division multiple access (TDMA) radio receiver, the equipment comprising:
- means for taking samples from symbol sequences of a received signal over a TDMA timeslot; and
- a modulation detector for generating a signal path corresponding to the TDMA timeslot or a portion thereof, wherein
- the equipment is arranged to determine an error estimate representing the erroneousness of the signal path generated, to compare the error estimate representing the erroneousness of the signal path generated with a predetermined threshold value, and to recognize the reception of the interfering signal if the error estimate is greater than the predetermined threshold value, and
- the equipment is further arranged to at least in part generate the error estimate by individually determining a plurality of point to point quadratic error comparisons between the generated signal path and a reference signal path.

* * * * *

UNITED STATES PATENT AND TRADEMARK OFFICE
CERTIFICATE OF CORRECTION

| | |
|---|---|
| PATENT NO. | : 7,016,434 B1 |
| APPLICATION NO. | : 09/700951 |
| DATED | : March 21, 2006 |
| INVENTOR(S) | : Huttunen, Mikko |

Figure 3A:
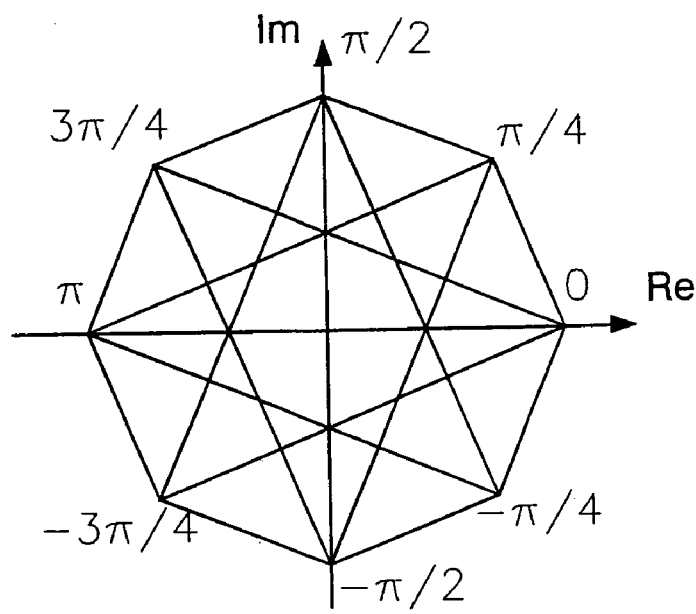
FIG. 3 shows a phase shift diagram of $\pi/4$-DQPSK modulation.
FIG. 3B shows constellation points of $\pi/4$-DQPSK modulation.
Figure 3B:
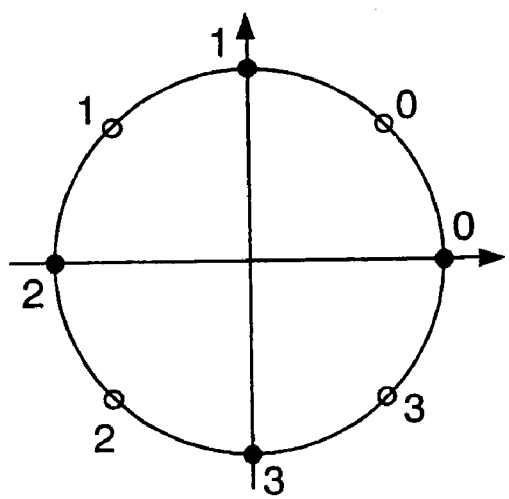

It is certified that error appears in the above-identified patent and that said Letters Patent is hereby corrected as shown below:

Column 2, line 47 is amended to read:

--FIG. 3A shows a phase shift diagram of $\pi/4$-DQPSK--.

Signed and Sealed this

Eighteenth Day of July, 2006

JON W. DUDAS
*Director of the United States Patent and Trademark Office*